Dec. 31, 1963 A. J. MONCRIEFF-YEATES 3,116,433
PRODUCTION OF NEUTRAL MOLECULAR BEAMS
Filed June 15, 1959 2 Sheets-Sheet 1

ALEXANDER J. MONCRIEFF-YEATES,
INVENTOR.

BY
Barbeler & Lewis

Dec. 31, 1963  A. J. MONCRIEFF-YEATES  3,116,433
PRODUCTION OF NEUTRAL MOLECULAR BEAMS
Filed June 15, 1959  2 Sheets-Sheet 2

ALEXANDER J. MONCRIEFF-YEATES,
INVENTOR.

United States Patent Office 3,116,433
Patented Dec. 31, 1963

3,116,433
PRODUCTION OF NEUTRAL MOLECULAR
BEAMS
Alexander J. Moncrieff-Yeates, Fullerton, Calif., assignor to Giannini Controls Corporation, Pasadena, Calif., a corporation of New York
Filed June 15, 1959, Ser. No. 820,303
15 Claims. (Cl. 313—63)

This invention has to do with the production of beams of rapidly moving, electrically neutral particles which are of substantially atomic or molecular dimensions. Such beams will be referred to for convenience as molecular beams, without implying that all the atoms of a beam particle are necessarily joined by chemical bonds.

The invention relates more particularly to the production of such molecular beams in which the molecular density corresponds to pressures far below atmospheric, such as are attained by regular vacuum techniques.

A more particular object of the invention is to produce molecular beams in which the random component of the particle velocities is small compared to the general drift velocity.

The invention is concerned especially with the production of such particle beams in which the drift velocity is higher than can conveniently be produced by conventional techniques that depend upon thermodynamic properties of gases. Those known techniques include, for example, directly powered circulation of gas, as in blowers and wind tunnels, and the sudden or gradual release of compressed gas, as in shock tubes.

The invention contemplates the production of molecular beams having a wide range of velocities, particle densities and sectional areas, according to the particular use for which the beam is intended. In particular, the molecular beams of the invention may have a small and well defined sectional area, like an air jet from a conventional nozzle; or may have relatively large transverse dimensions, and thus contain an appreciable volume within which the beam characteristics are substantially uniform.

Molecular beams of the described jet type are particularly suitable for use as a tool for etching surfaces; for experimental study of rheology and of surface phenomena, for inducing polymerization, and the like. Whereas beams of rapidly moving ions have been effectively employed for such purposes, neutral molecular beams of comparable velocity offer many promising advantages, but have not been previously available.

The molecular beams of the invention having relatively large sectional areas have the particular advantage that they permit the realistic and effective simulation of the conditions encountered by missiles in hypervelocity flight in the aeropause. It has previously been extremely difficult to study the detailed interactions of missiles, moving typically at velocities characteristic of earth satellites, upon the environment existing at elevations from about 70 to about 100 miles above the earth's surface. Aeronautical wind tunnels, and even shock tubes and blow-down tunnels are incapable of reaching the required velocities, and cannot approach the uniformity of molecular velocities characteristic of the actual environment.

An important specific object of the present invention is to attain more closely the production of substantially neutral molecular beams composed of the same molecular species believed to predominate in the aeropause, having the correct molecular density, and moving with substantially the correct drift velocity and internal velocity distribution to simulate the molecular flux actually encountered by missiles under typical conditions of re-entry from space into the aeropause. The invention is concerned more especially with the phase of that re-entry which precedes the extreme thermodynamic heating that typically causes ablation of the vehicle. During the earlier phase, at lower molecular densities, the principal phenomena to be studied involve effects upon the environment itself, rather than upon the vehicle. Effective study of such effects requires more accurate simulation of the initial internal conditions of the environment, particularly with respect to degree of ionization, molecular dissociation and temperature energy or random velocity of the molecules. The techniques of the present invention are particularly suitable for producing molecular beams in which conditions of that type can be effectively controlled.

Molecular beams of the described types are produced, in accordance with the present invention, by a combination of steps which include separately accelerating positive and negative ions, preferably to substantially equal velocities, by respective electrical fields; and then bringing the two beams of oppositely charged particles together so that they move in substantially the same direction and coalesce to form a common beam of positive and negative ions intimately mixed with one another. In the region where the beams are thus intermixed, the positive and negative ions freely combine to form neutral molecules that move at essentially the initial common velocity of the ion beams. The purity of the resulting neutral molecular beam may be controlled by removing from the beam any residue of uncombined ions by means of transverse electric or magnetic fields.

A full understanding of the invention and of its further objects and advantages will be had from the following description of certain illustrative examples. The particulars of that description, and of the accompanying drawings which form a part thereof, are intended only for illustration and not as a limitation upon the scope of the invention, which is defined in the appended claims.

Figure 1:
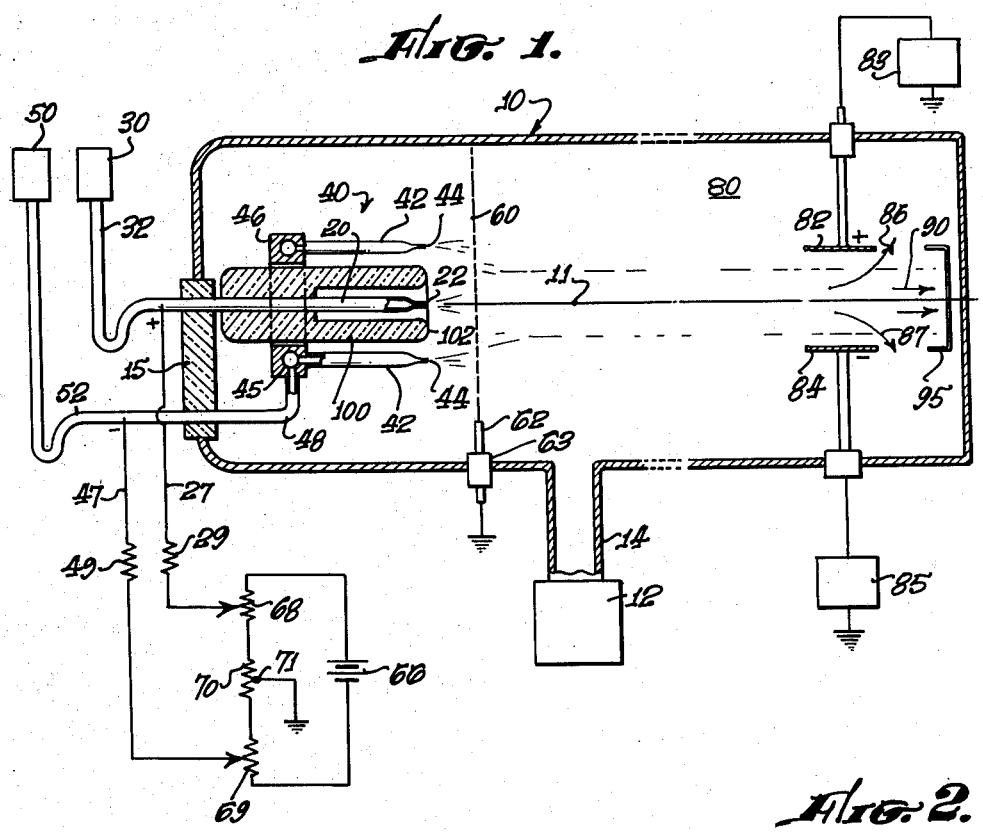
FIG. 1 is a schematic drawing representing one illustrative manner of carrying out the invention.
Figure 1A:
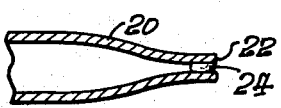
FIG. 1A is a detail of FIG. 1 at enlarged scale.

In FIG. 1 an evacuable vessel is represented at 10 with suitable vacuum pumps 12, which may be of conventional form, for withdrawing gas from vessel 10 through the conduit 14 and expelling it into the atmosphere. Several such pumps and evacuating connections may be provided at any desired parts of the vessel to attain the desired vacuum, which is typically from about $10^{-5}$ to $10^{-6}$ mm. of Hg. A first electrode assembly comprises the single electrode tube 20, which extends through the vessel wall in sealed and electrically insulated relation, as indicated by the dielectric mounting block 15. Tubular electrode 20 terminates in a very fine needle-like orifice 22 which lies on the axis 11 of vessel 10. The size of the orifice 22 is exaggerated in the drawings for clarity of illustration. Orifice 22, which is typically of the order of 0.1 mm. in diameter, preferably contains a porous plug, represented at 24 in FIG. 1A. Plug 24 may comprise any suitable type of material, such as the natural zeolites and artificial sintered products, for example, and typically has pores of the order of $10^{-4}$ to $10^{-5}$ cm. in diameter on its outer face.

Electrode tube 20 is connected to a suitable source 30 of a selected liquid medium, the exact nature of the medium depending upon the desired type of molecular beam. Source 30 may be considered to represent a vessel connected to electrode 20 by a flexible tube 32, so that the pressure head of fluid supplied to the electrode tip may be varied by raising or lowering the vessel. Source 30 may include more elaborate pressure and flow controlling mechanisms of any desired type. In particular, means for cooling the liquid medium and electrode may be provided, if desired.

A second electrode assembly is shown at 40, comprising a plurality of tubes 42 which terminate in tips 44. Those tips preferably contain porous plugs as already described for tip 22. Only two tubes 42 are illustratively shown, mounted on a header ring 46, which spacedly surrounds electrode 20. Any desired number of electrodes 42 may be provided, six being an illustrative number. It is generally desirable that the tube tips 44 effectively surround tip 22 in substantially axially symmetrical manner. The radial spacing of tips 44 from tip 22 is exaggerated in the figure for clarity of illustration. That radial spacing may vary considerably, depending upon the nature of the desired molecular beam, but is typically of the order of a millimeter or less. Electrode assembly 40 is mounted on block 15 by means of the support tube 48, which communicates with each electrode tube 42 through suitable passages 45 in header ring 46. A flexible connection 52 is indicated between tube 48 and the source 50, from which a second liquid is supplied to the electrode tips 44 of second electrode assembly 40. Due to the relatively small radial spacing of the tips 44, the difference in pressure head among them is ordinarily negligible. However, the apparatus may, if desired, be rotated through 90 degrees from the position shown, which is only illustrative, so that all of the tips 44 lie in a common horizontal plane, directed either upward or downward. Downwardly directed orifices are particularly convenient when it is desired to cool one or both of the electrode assemblies as by immersing them in conventional manner in liquid air, liquid hydrogen or the like. The electrodes 20 and 40 will be referred to as source electrodes, since they act as ion sources for the molecular beam.

An accelerating electrode is shown schematically at 60, supported on the rod 62 and the insulative mounting block 63. Electrode 60 may comprise a screen of fine wires which is highly permeable to particles of molecular size. Alternatively, a ring electrode may be used, mounted coaxially of electrode 20, the diameter of the ring or screen being typically from 10 to 100 times the diameter of the electrode tip.

One or more suitable sources of electrical power are provided for maintaining source electrodes 20 and 40 at opposite potentials with respect to accelerating electrode 60. As illustrated, the latter electrode is grounded, while negative and positive voltages are supplied to electrodes 20 and 40, respectively, via the lines 27 and 47, respectively, from the battery 66. Battery 66 is connected across the voltage dividing circuit comprising the series connected potentiometers 68 and 69 and resistance 70, as shown. A center tap 71 on resistor 70 is grounded. The potentiometers represent an illustrative means for adjustably and independently controlling the voltages supplied to the respective electrodes. Current limiting resistors 29 and 49 may be inserted in lines 27 and 47, respectively, and suitable means of conventional type may be provided for measuring the electrode potentials and currents and other variables of the system, as may be required.

The axial spacing of accelerating electrode 60 from electrodes 20 and 40 is made sufficiently small that many lines of force from the latter extend to electrode 60, or at least extend an appreciable distance in its direction. Because of the great difference in areas between accelerating electrode 60 and the needle-like terminations of the source electrodes, the field strength immediately adjacent the latter may be made very high, even with a modest total voltage difference across the entire field. For example, with an electrode diameter ratio of the order of 100, and with an axial spacing of about 1 mm. between source and accelerating electrodes, a voltage difference of only 10 volts can produce a field strength at the electrode tips of the order of $10^6$ volts per cm. With a configuration of that type, the field strength at the small liquid meniscus formed within the electrode tips can readily be made large enough to overcome the surface tension of the liquid. The exact field required depends, of course, upon the liquid used as well as on other factors. But fields of the order of $10^6$ volts/cm. are sufficient to extract singly charged electrons, molecules or clumps of molecules of many types from the liquid surface. The ions thus produced are rapidly accelerated away from the surface in the direction of accelerating electrode 60.

Such ions with positive charge are produced at electrode tip 22, and negatively charged ions are simultaneously produced at the surrounding tips 44. The ions from each tip experience most of the total voltage drop in the immediate vicinity of their respective source electrodes, due to the highly concentrated nature of the field, already mentioned. Hence the ions are almost immediately accelerated to velocities that represent a large fraction of the total applied positive and negative voltages. The ions from each tip thus form a distinct ion beam, accelerated by its own field in a manner largely independent of the other electrode tips.

Due to the relatively close radial positioning of the positive and negative tips, however, the paths of the respective ion beams tend very quickly to coalesce into a common path. That tendency is accelerated by the mutual repulsion of the ions within each initial beam, since that repulsion causes the sectional area of each beam to increase. As soon as the adjacent beams overlap, the resulting intermixing of the ions has two primary results. The space charge within each beam quickly becomes partially or wholly neutralized by the presence of ions of opposite charge, so that the resulting beam of mixed ions has little or no further tendency to expand. And the closely adjacent ions of opposite charge, moving in the same general direction at comparable or equal speeds, readily combine with each other to form electrically neutral particles.

With the present illustrative configuration, such recombination takes place primarily as the beam passes along a relatively long drift tube provided for that purpose and indicated generally at 80. A sufficient length of drift tube is provided to permit recombination of the desired fraction of the ions. Due to the substantial uniformity of the motion of the positive and negative ions, recombination proceeds more rapidly than under the usual conditions of rapid opposite movement of two ion species.

At a selected point of drift tube 80, means are preferably provided for extracting from the beam any remaining uncombined ions. That may be done by producing a transverse electric or magnetic field. In the present embodiment, the parallel plates 82 and 84 are supplied with suitable positive and negative voltages by means indicated schematically at 83 and 85. The negative ions are deflected toward plate 82 and the positive ions toward plate 84, as represented schematically at 86 and 87. The remainder of the beam at 90 thus comprises only the neutral molecular particles that were formed by mutual neutralization of the ions of the initial positive and negative ion beams.

The resulting neutral molecular beam 90 may be utilized in any desired manner, suitable apparatus for that purpose being provided as indicated schematically at 95. Apparatus 95 may represent, for example, a sample of solid material to be etched by the molecular beam; or a surface element of a missile, together with suitable instrumentation of conventional type for measuring ionization of the beam at that surface. The beam that reaches apparatus 95 is typically quite homogeneous with respect to the nature of its particles and the uniformity of their movement. That uniformity of particle velocity is greatly aided by the fact that the initial ions are produced without use of thermal energy, which necessarily would cause relatively large random components of velocity. By substituting field emission of ions from surfaces that may be at normal temperatures, or at supercooled temperatures, such causes of high random velocities are completely avoided.

Figure 2:
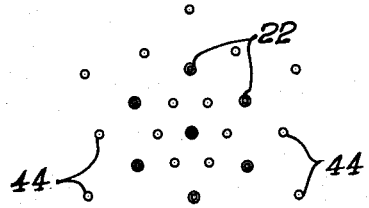
FIG. 2 is a transverse fragmentary section representing a modification.

With a single source electrode unit of the type represented schematically in FIG. 1, most of the energy in the resulting molecular beam is typically confined to a region relatively close to the axis 11. If a beam of larger diameter or higher molecular density is desired, a plurality of such source electrode units may be provided. Such an electrode array may be arranged, for example, in a common plane perpendicular to axis 11, and may utilize a single accelerating electrode of correspondingly increased area. An illustrative pattern of such positive and negative source electrodes 22 and 44 is shown schematically in transverse elevation in FIG. 2. It will be seen that in such an arrangement the ion sources of each polarity form an annular array surrounding the ion sources of opposite polarity. The ions from each tip are thus neutralized by ions from the surrounding tips. The source electrodes need not comprise discrete tips, but may include narrow slit orifices arranged in any suitable manner which effectively surrounds each ion source with sources of opposite polarity.

A wide variety of liquids may be employed as ion sources, the applied voltage or the form of the electric field being suitably varied to provide adequate field intensity at the liquid surface in each instance. Particularly when it is desired to keep the total accelerating field relatively low, liquids having low surface tension are preferred. It is also desirable generally to employ liquids with low vapor pressure, so that a minimum number of un-ionized molecules will escape from the liquid surface. Illustrative of liquids which combine low surface tension and low vapor pressure to an unusual degree are acetone and the dihydric olefins or glycols, of which ethylene glycol is typical. Such liquids yield either positive or negative ions, depending upon the polarity of the applied field.

The described provision of a porous plug within each electrode tip divides the liquid surface that is exposed to the electric field into a plurality of very small areas, the size of those areas being determined by the pore size of the material used. That has the advantage of physically limiting the size of any clumps of molecules that can be drawn from the surface. Many sintered materials have pore sizes corresponding to 100 molecular diameters or less.

Furthermore, if the electrical conductivity of the liquid is relatively low, it is helpful to use a porous plug of conductive material, such as sintered tungsten, for example. Electrical connection can then be made to the fluid through the plug, and the material of the electrode tube itself need not be conductive. The effective electrical area of the electrode then corresponds substantially to the inner, rather than the outer, diameter of the tube tip.

When the selected liquid has adequate conductivity it is usually preferable to use a porous plug of non-conductive material, such as sintered tungsten carbide, for example. In combination with an electrode tip of insulative material, the effective electrode area is then further reduced to that of the exposed liquid surface.

The form, and hence the intensity, of the electric field may be controlled in accordance with the known laws of electromagnetic fields by inserting auxiliary electrodes or dielectric shields as desired. In particular, a dielectric shield of sleeve form, as indicated at 100, may be mounted coaxially of electrode tube 20 with its forward annular face 102 at or near the general plane of the electrode tips 22 and 44. Shield 100, which preferably has a high dielectric constant, may comprise titanium dioxide or any suitable conventional ceramic material, or may be of a material having ferro-electric properties, such as the niobates, tantalates and columbates, of which barium titanate is an example. Such a shield tends to repel the electric lines of force, causing them to concentrate more strongly along the axes of the respective electrode tips.

Particularly when such a shield is provided, the action of accelerating electrode 60 is not entirely essential, and that electrode may be positioned farther from the source electrodes, or even dispensed with altogether. In general, however, the presence of accelerating electrode is helpful, and it is preferably placed no farther from the source electrodes than the lateral spacing between source electrodes of opposite polarity.

Figure 3:
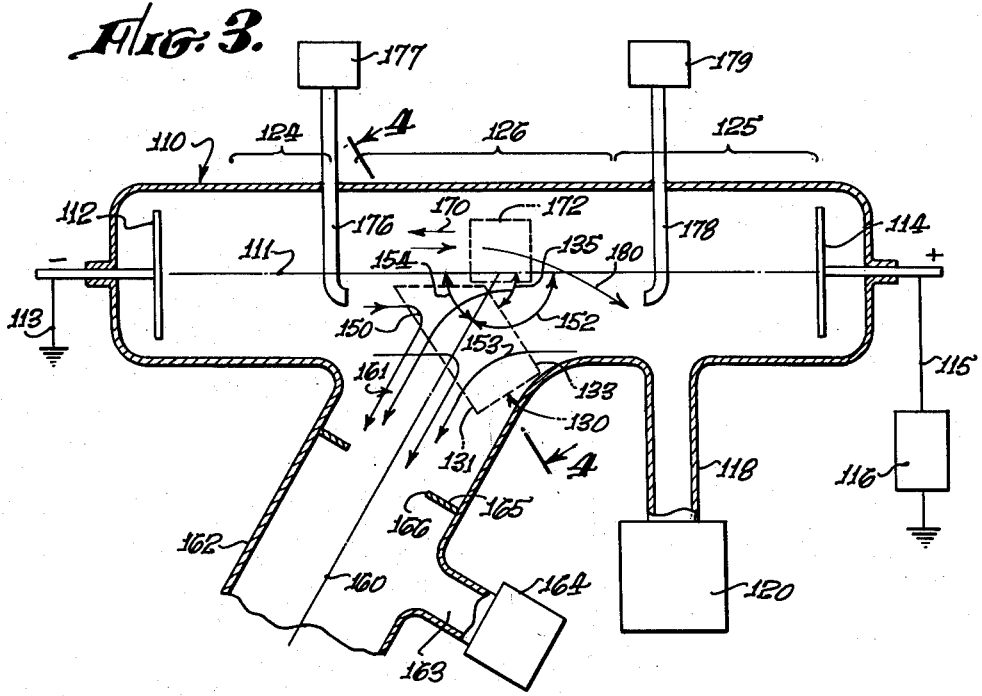
FIG. 3 is a schematic drawing representing another illustrative manner of carrying out the invention.

FIG. 3 represents a second illustrative embodiment of the invention. An elongated evacuated tube, typically of glass, is represented at 110, with a conventional cathode 112 and anode 114 sealed into the left and right tube ends, respectively, for producing a gaseous discharge. As typically shown, cathode 112 is grounded at 113 and a definite positive potential is applied to anode 114 via line 115, from suitable electrical power and series impedance means represented schematically at 116. A side arm 118 leads to suitable means which are represented schematically at 120 and may be of known type, for evacuating tube 110 and supplying to it a selected type of gas to produce any desired pressure within the tube.

When a suitable voltage, which may vary from about 100 to about 3000 volts, is applied through a suitable current limiting impedance to a discharge tube of the type described containing gas at a corresponding pressure, typically of the order of from about 50 mm. to about $10^{-3}$ mm. of Hg, a gaseous glow discharge is readily produced, exhibiting such well known phenomena as the negative glow, indicated at 124, the positive column, indicated at 125, and the Faraday dark space, indicated at 126. The Faraday dark space contains positive and negative ions at approximately equal concentrations moving longitudinally of the tube in opposite directions under the influence of the applied electrostatic field.

Figure 4:
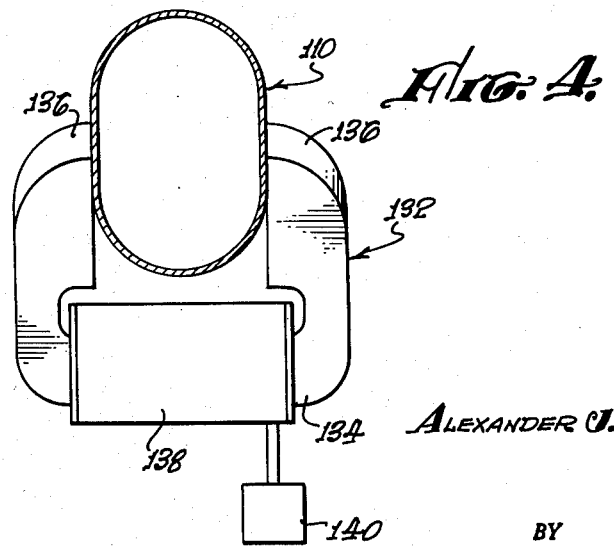
FIG. 4 is a schematic section on line 4—4 of FIG. 3.

In accordance with a further aspect of the present invention, those oppositely moving ions are deflected through complementary angles by means of suitably arranged fields, so that after deflection both types of ions are travelling in substantially the same transverse direction. As an example, a magnetic field of limited dimensions may be applied transversely of the tube axis. The dashed line 130 represents illustrative boundaries of such a magnetic field, which is directed perpendicularly into the paper, as seen in FIG. 3. Such a magnetic field can be produced in known manner, for example by means of an electromagnet 132, such as is shown schematically in FIG. 4 but omitted from FIG. 3 for clarity of illustration. Electromagnet 132 has a magnetic core 134 with pole pieces 136 shaped to correspond to the desired form of field 130. The magnet winding 138 is supplied with electrical current from a source indicated at 140. Source 140 may be considered to include suitable mechanism for controlling and measuring the magnetizing current, to facilitate accurate and convenient control of the magnetic field intensity.

The particular form of field shown has two parallel boundaries 131 and 133, which form with tube axis 111 an oblique angle, indicated at 135. When the electrons, which constitute the negative ions of dark space 126, encounter magnetic field 130 at its boundary 131, they are sharply deflected clockwise, as indicated at 150, and leave the field after being reflected through an angle indicated at 152. That angle is equal to twice the oblique field angle 135. Positive ions enter field 130 through its opposite boundary 133, and are deflected counterclockwise, as at 153, with a very much smaller curvature than that of the relatively light electrons. By suitable adjustment of the field strength, a selected type and velocity of positive ions may be caused to emerge from the field through its boundary 131 after suffering deflection through the angle indicated at 154, which is the complement of angle 152. The emerging positive ions are then travelling parallel to the reflected electrons. A mixed beam 161 of positive and negative ions is therefore produced, directed generally along an axis indicated at 160.

A side tube 162 is provided at the appropriate position on main discharge tube 110 to accommodate that beam. As the intermixed ion beam proceeds along tube 162, the positive and negative ions recombine in the manner already described in connection with FIG. 1. After a suitable length of drift tube has been traversed, the remaining uncombined ions may be removed by a deflection field, as already described, producing a neutral molecular beam. Only the initial portion of tube 162 is shown explicitly in FIG. 3, the remainder of the tube typically corresponding to the right-hand portion of tube 10 in FIG. 1. It is usually desirable to maintain a pressure in tube 162 lower than that in discharge tube 110. That may be accomplished by providing one or more outlet connections 163 with suitable vacuum pumps, indicated at 164; and reducing the flow of neutral gas molecules between tubes 110 and 162 by mounting one or more diaphragms 165 in the mouth portion of tube 162. A large diaphragm aperture 166 is shown in FIG. 3 for clarity of illustration, but a relatively small opening may be used when a larger pressure differential is to be maintained. Non-focusing devices of known type may be provided to facilitate passage of the ion beam 161 through diaphragm aperture 166.

The magnetic field 130 preferably occupies only a portion of the sectional area of discharge tube 110. The remaining area may then carry on the discharge in the usual manner, as represented schematically at 170. Excessive buildup of space charge, due to removal of ions from the discharge, is then prevented by transverse migration of ions from the undisturbed part of the discharge. That transverse ion movement may be facilitated by suitably placed magnetic or electric fields. For example, a magnetic field may be produced within such a limited area as is illustratively represented at 172, directed into the plane of the paper in FIG. 3. That field is typically produced by an electromagnet generally similar to that shown in FIG. 4. Magnetic field 172 is typically far less intense than field 130, and deflects electrons through a moderate angle such, for example, as one half angle 135. Electrons from discharge region 170 are thereby supplied, as at 180, to the region directly to the right of field 133, replacing the electrons removed from the discharge by the latter field.

Gas molecules are preferably supplied to the discharge tube in sufficient quantity to replenish the positive and negative ions removed via side tube 162, and also to replenish any molecules removed by pumping. It is desirable to supply such replenishing gas directly to the body of the discharge, as via the supply tubes represented at 176 and 178. Separate control means are indicated at 177 and 179 for controlling the gas flow through those respective tubes, which supply gas to the body of the discharge on opposite sides of magnetic field 130.

In both of the illustrative embodiments of the invention described above, it is generally desirable to restrict the cross sectional area of the described ion beams by use of known techniques of electromagnetic focusing. That can be done particularly effectively by a magnetic field in which the lines of force are circles about the beam axis.

Whereas some end uses of the produced neutral beam require that the molecular flux be substantially constant over an appreciable period of time, other uses permit the final beam to be intermittent. In the latter instance some or all of the described electric and magnetic fields may also be intermittent. That is particularly helpful, for example, in the case of focusing fields that are produced by electrical windings without any magnetic core, since very large currents are sometimes required to make such fields effective. By employing periodically pulsed circuits for such purposes, problems of heating and power supply can be greatly simplified.

It is ordinarily preferable, as already indicated, that the mixed ion beam injected into the drift tube comprise positive and negative ions of substantially equal and uniform velocity. However, considerable latitude of velocity may be allowed the negative ions when they comprise electrons. Since electrons are much less massive than the positive ions, they contribute very little to the final velocity of the neutral particles produced by recombination. Even a large random velocity component in the electrons is substantially eliminated on recombination. Recombination takes place more readily, however, when positive and negative ion velocities are essentially uniform and equal.

I claim:

1. A system for producing a beam of predominantly neutral particles of substantially molecular size; said system comprising the combination of structure forming an evacuable chamber, means for producing respective beams of positive and negative ions in the chamber, means for accelerating said ion beams along respective paths, said paths having initial portions that are spaced from each other and having subsequent portions that substantially coincide to form a common path spaced from said initial portions, positive ions of one beam and negative ions of the other beam combining along said common path to form a common beam of predominantly neutral particles.

2. A system for producing a beam of neutral particles of substantially molecular dimensions; said system comprising the combination of structure forming an evacuable chamber, means for producing respective beams of positive and negative ions in the chamber, means for accelerating said ion beams along respective paths, said paths having initial portions that are spaced from each other and having subsequent portions that substantially coincide to form a common path spaced from said initial portions, positive ions of one beam and negative ions of the other beam combining along said common path to form a common beam of predominantly neutral particles, and means for transversely deflecting uncombined ions out of the common beam.

3. A system for producing a beam of predominantly neutral particles of substantially molecular size, said system comprising the combination of structure forming an evacuable chamber, first tubular electrode means mounted in the chamber and terminating in at least one needle orifice, second electrode means spacedly opposing the orifice and axially perforated, means for supplying a liquid medium through the tubular electrode means to produce a liquid surface at the orifice, means for producing between the first and second electrode means a voltage sufficient to draw charged particles of the medium from said surface and to accelerate said charged particles to form a particle beam, and means for neutralizing the charge on said particles while they are in the beam.

4. A system as defined in claim 3, and including a porous plug mounted within the tip portion of the needle orifice, the pore openings in the exposed face of the plug limiting the size of said charged particles.

5. A system as defined in claim 3, and in which the last said means comprises third electrode means having sharp terminal portions radially spaced from the needle orifice and effectively surrounding the same, said terminal portions being adapted to emit ions having a charge opposite to that of the said charged particles, and means for producing between the second and third electrode means a voltage opposite to that between the second and first electrode means to accelerate the ions substantially parallel to the particle beam and closely adjacent the same, said ions combining with charged particles of the beam to neutralize the same.

6. A system for producing a beam of predominantly neutral particles of substantially molecular size, said system comprising the combination of structure forming an evacuable chamber, a two-dimensional array of mutually spaced finely pointed positively and negatively charged electrode elements arranged alternately along an array surface in the chamber, two-dimensional accelerating electrode means spacedly opposing the array elements, the effective surface of the accelerating electrode means being large compared to the sum of the element areas, means for supplying ions to the electrode elements, means for producing oppositely directed electrostatic fields between the accelerating electrode and the positive and negative electrode elements, respectively, to simultaneously draw respective beams of ions of corresponding polarity therefrom, said ion beams coalescing to form a common beam wherein positive and negative ions combine to form neutral particles of substantially molecular size.

7. A system for producing a substantially neutral beam of molecular particles, said system comprising the combination of structure forming an evacuable chamber, means for producing in the chamber a gaseous discharge having a region in which positive and negative ions move along the discharge in opposite directions, and means for producing a magnetic field of limited dimensions directed transversely of the discharge in said region to deflect positive and negative ions in a common transverse direction.

8. A system as defined in claim 7, and wherein the axial boundaries of the magnetic field are substantially parallel to each other and oblique to the direction of the discharge.

9. A system as defined in claim 7, and including means for supplying additional ions to the discharge during operation thereof at a region longitudinally adjacent said magnetic field to replace the deflected ions.

10. A system as defined in claim 7, and including means for directing ions of at least one charge around said magnetic field into a region longitudinally adjacent said field.

11. A system as defined in claim 7, and including means for producing a second magnetic field of smaller intensity than the first said magnetic field and transversely offset therefrom.

12. A system for producing a substantially neutral beam of molecular particles, said system comprising the combination of structure forming an evacuable chamber, means for producing in the chamber oppositely directed streams of particles carrying positive and negative charges, respectively, and means for deflecting particles of both streams along a common direction.

13. A system for producing a substantially neutral beam of molecular particles, said system comprising the combination of structure forming an evacuable chamber, means for producing in the chamber oppositely directed streams of particles carrying positive and negative charges, respectively, means for deflecting particles of both streams along a common direction, positive and negative deflected particles combining to form neutral particles moving in said common direction, and means for deflecting uncombined charged particles away from said neutral particles to produce a beam of predominantly neutral particles.

14. A system for producing a substantially neutral beam of molecular particles, said system comprising the combination of structure forming an evacuable chamber having first and second chamber portions separated by an apertured wall, means for producing in the first chamber portion oppositely directed streams of particles carrying positive and negative charges, respectively, means for deflecting particles of both streams along a common direction through the wall aperture into the second chamber portion, and means for maintaining a pressure in the second chamber portion lower than that in the first chamber portion, positive and negative deflected particles combining to form neutral particles in the second chamber portion.

15. A system for producing a substantially neutral beam of molecular particles, said system comprising the combination of structure forming an evacuable chamber having first and second chamber portions separated by an apertured wall, differential pumping means for maintaining a lower pressure in the second chamber portion than in the first chamber portion, means for producing in the first chamber portion oppositely directed streams of particles carrying positive and negative charges, respectively, means for deflecting particles of both streams along a common direction through the wall aperture to form a common beam in the second chamber portion, positive and negative particles of said common beam combining to form neutral particles, and means for deflecting uncombined charged particles away from said neutral particles to produce a beam of predominantly neutral particles.

References Cited in the file of this patent

UNITED STATES PATENTS

| | | |
|---|---|---|
| 2,219,033 | Kuhn et al. | Oct. 22, 1940 |
| 2,489,436 | Salisbury | Nov. 29, 1949 |
| 2,765,975 | Lindenblad | Oct. 9, 1956 |
| 2,836,750 | Weimer | May 27, 1958 |
| 2,920,235 | Bell et al. | Jan. 5, 1960 |

OTHER REFERENCES

"Kinetic Theory of Gases," by L. B. Loeb, published by McGraw-Hill Book Company, New York, 1927 edition.